United States Patent [19]
Yamato et al.

[11] Patent Number: 4,855,887
[45] Date of Patent: Aug. 8, 1989

[54] CURRENT AND FREQUENCY CONVERTER HAVING MEANS TO REDUCE SWITCHING LOSSES

[75] Inventors: Ikuo Yamato; Norikazu Tokunaga; Yasuo Matsuda; Hisao Amano, all of Hitachi, Japan

[73] Assignee: Hitachi, Ltd., Tokyo, Japan

[21] Appl. No.: 247,508

[22] Filed: Sep. 22, 1988

[30] Foreign Application Priority Data

Sep. 30, 1987 [JP] Japan ................. 62-243811

[51] Int. Cl.[4] ........................................... H02M 5/22
[52] U.S. Cl. ........................................ 363/8; 363/54; 363/160; 363/163
[58] Field of Search ................ 363/8, 56, 159, 160, 363/163, 54

[56] References Cited

U.S. PATENT DOCUMENTS 4,479,175 10/1984 Gille et al. ........................ 363/159
4,607,322 8/1986 Henderson ........................ 363/56
4,697,219 9/1987 Mitsuoka ........................ 363/51

FOREIGN PATENT DOCUMENTS 1376711 9/1964 France ........................ 363/8
59480 4/1982 Japan ........................ 363/8
218866 12/1983 Japan ........................ 363/54
44072 2/1987 Japan .
44073 2/1987 Japan .
118772 5/1987 Japan .

Primary Examiner—William H. Beha, Jr.
Attorney, Agent, or Firm—Antonelli, Terry & Wands

[57] ABSTRACT

A power conversion apparatus comprises an inverter for converting a voltage of a DC power source into AC power having a frequency higher than the commercial frequency, a transformer, fed by the inverter, for outputting AC power, which is adjusted at a desired voltage, a frequency converter, formed by two pairs of two gate turn-off thyristors (GTOs) connected in reverse-parallel, for converting the frequency of the AC power supplied from the transformer into the commercial frequency, and an energy regenerating device having capacitors for absorbing the energy of a spike voltage occurring due to a circuit inductance upon interruption of a current of each GTO of the frequency converter and a bridge circuit, formed by GTOs and diodes connected in reverse-paralel therewith, for switching over the direction of connecting the capacitors with a secondary winding of the transformer in accordance with the polarity of a voltage of the secondary winding in such a manner that the energy stored in the capacitors is regenerated to the transformer.

9 Claims, 7 Drawing Sheets

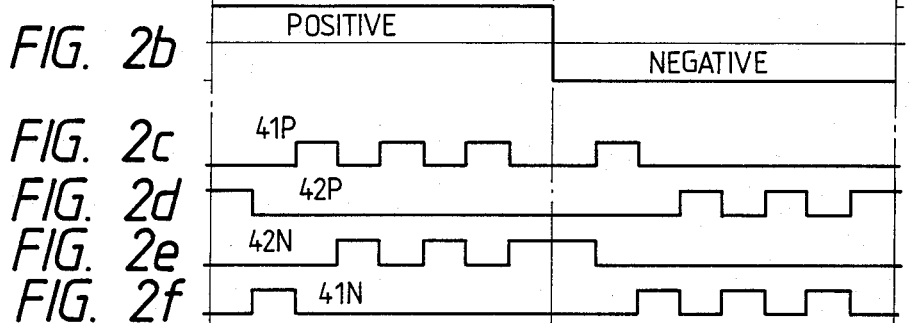
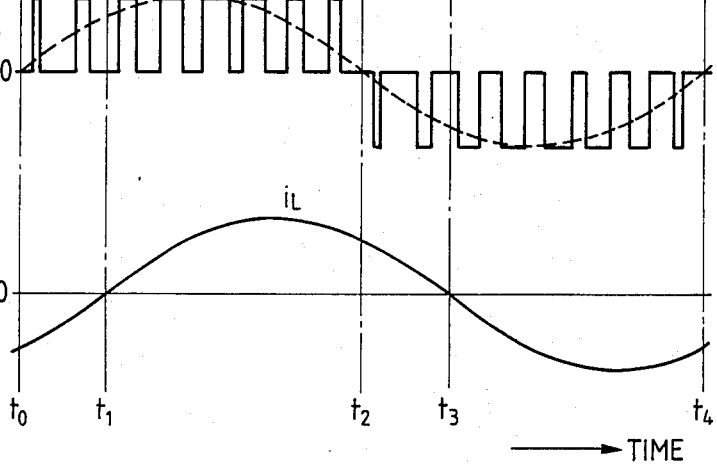

FIG. 3a $e_2$
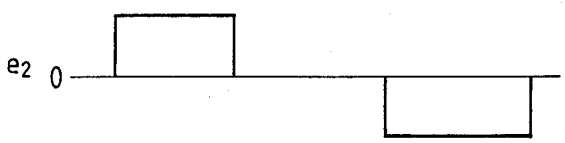
FIG. 3b 42P
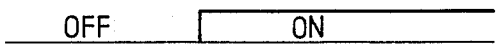
FIG. 3c 41N
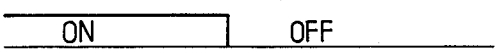
FIG. 3d $i_1$ & $i_2$
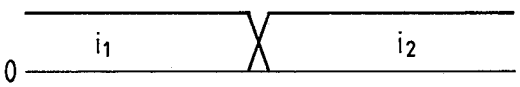
FIG. 3e
VOLTAGE
OF 41N
(WITHOUT
SNUBBER)
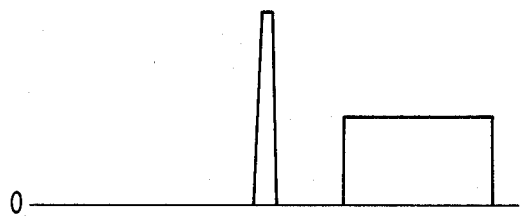
FIG. 3f
VOLTAGE
OF 41N
(WITH
SNUBBER)
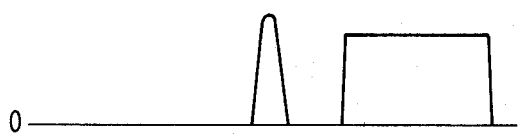
FIG. 4
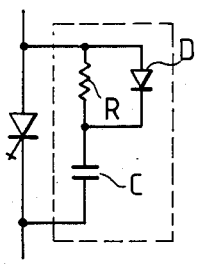

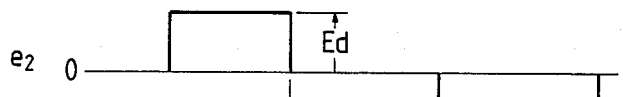
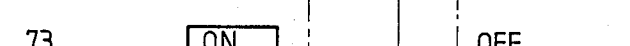
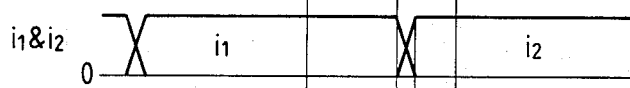
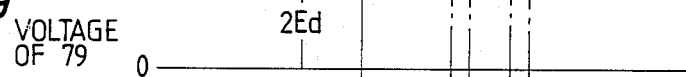
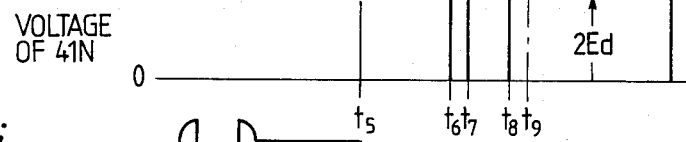

CURRENT AND FREQUENCY CONVERTER HAVING MEANS TO REDUCE SWITCHING LOSSES

BACKGROUND OF THE INVENTION

1. Field of the Invention

The present invention relates to an improvement of a power conversion apparatus of such a type that DC power is inverted into AC power of a considerably high frequency, which is converted into a desired frequency after the voltage of the AC power has been adjusted at a desired value.

2. Description of the Related Art

There is known a power conversion apparatus, in which DC power is at first inverted by an inverter into AC power of a frequency sufficiently higher than the commercial frequency and, after the voltage of the AC power has been adjusted by a transformer at a desired value, the frequency thereof is converted by a frequency converter into the commercial frequency, whereby the transformer can be reduced in its size.

In Japanese patent laid-open publications Nos. JP-A No. 62/44072 and 62/44073 (both published on Feb. 26, 1987), for example, there is proposed a power conversion apparatus, in which there is used as a frequency converter a line-commutated converter consisting of two switching elements connected in reverse parallel with each other. As is well known, a line-commutated converter is a converter that the commutation of current from one of switching elements of the converter to another depends on the voltage of a power source or the voltage induced in a load, such as a counter electromotive force of a motor.

A power conversion apparatus having such a frequency converter has the following problem in the case where a phase difference exists between an output voltage of the apparatus and an output current thereof. Even though the phase of the output voltage is different from that of the output current, the power conversion apparatus can continue a normal operation, only if they are in the same polarity. However, switching elements of the apparatus can not commutate the current flowing therethrough, in the case where the voltage and the current are in the different polarity.

Then, it is considered to employ, instead of a line-commutated converter as described above, a self-commutated converter as a frequency converter, which is capable of carrying out the commutation of current from one of switching elements of the converter to another without depending on any external voltage, such as a source voltage or a load voltage. To this end, a self-commutated converter is necessary to be formed by switching elements, such as transistors, gate turn-off thyristors (GTOs) and so on, with the self turn-off function or those equivalent thereto.

Since, in such a self-commutated converter, there appears a so called spike voltage across switching elements of the converter due to a circuit inductance, such as a leakage inductance of a transformer, upon the commutation of the switching elements, there is usually provided a snubber circuit in parallel with each switching element in order to absorb the spike voltage to protect the switching element.

As is well known, a spike voltage is caused by the energy, which is stored in a circuit inductance and discharged therefrom, when a switching element is turned off. The spike voltage can be suppressed by making a capacitor of a snubber circuit absorb the energy discharged from the circuit inductance. Although the energy stored in the capacitor is further discharged therefrom, when the switching element turns on, it is only consumed by a resistor of the snubber circuit. Therefore, the energy stored in the capacitor of the snubber circuit becomes a loss, which is well known as a switching loss. For this reason, as the repetition frequency of the switching operation of a frequency converter becomes high, the switching loss occurring in snubber circuits increases, whereby the conversion efficiency of a power conversion apparatus becomes worse.

SUMMARY OF THE INVENTION

An object of the present invention is to provide a high efficiency power conversion apparatus having no problem in the commutation operation of switching elements thereof, which is provided with an energy regenerating device for regenerating the energy of a spike voltage occurring upon interruption of a current flowing through a switching element to a power source side of the power conversion apparatus.

A feature of the present invention resides in that a self-commutated converter is employed as a frequency converter of a power conversion apparatus, in which the frequency converter is provided with an energy regenerating device comprising first means for absorbing the energy of a spike voltage occurring upon interruption of a current flowing through a switching element of the frequency converter and second means for switching over the direction of connecting the first means with a transformer of the power conversion apparatus in accordance with the polarity of a voltage output by the transformer in such a manner that the energy stored in the first means is regenerated to the transformer.

According to the present invention, since the energy of a spike voltage is absorbed by the first means, which is coupled to the transformer, a voltage of the first means is cramped by a voltage output by the transformer, as well as the energy stored therein is regenerated to the transformer, whereby only the necessary energy is communicated between the first means and the transformer. Accordingly, the efficiency of the power conversion apparatus can be much improved.

BRIEF DESCRIPTION OF THE DRAWINGS

FIGS. 2a to 2h are drawings for explaining the power conversion operation of the apparatus shown in FIG. 1;

FIGS. 3a to 3f are drawings for explaining in detail the commutation operation in a conventional power conversion apparatus and the problem thereof;

FIG. 4 shows an example of a snubber circuit connected in parallel with a switching element;

FIGS. 5a to 5i are drawings for explaining in detail the commutation operation of the power conversion apparatus of FIG. 1;

DESCRIPTION OF THE PREFERRED EMBODIMENTS

In the following, description will be made of some embodiments of the present invention, with reference to the accompanying drawings.

Figure 1:
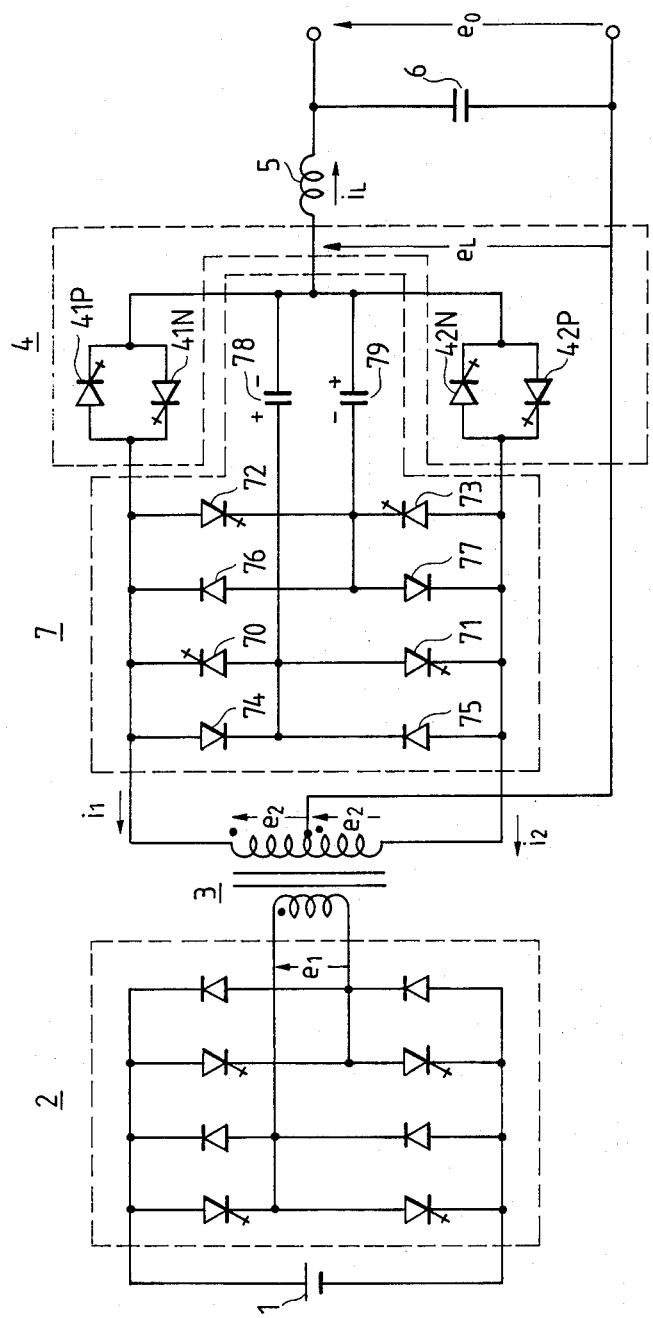
FIG. 1 schematically shows a circuit arrangement of a power conversion apparatus according to an embodiment of the present invention.

FIG. 1 is a drawing schematically showing a circuit arrangement of one of the embodiments of the present invention, in which reference numeral 1 denotes an appropriate DC power source, which can be a battery or a rectifier, and reference numeral 2 an inverter for converting DC voltage of the power source 1 into AC voltage $e_1$ of a frequency sufficiently higher than the commercial frequency.

As shown in the figure, the inverter 2 is formed by a bridge circuit composed of switching elements, such as gate turn-off thyristors (GTOs) or transistors, each having the self turn-off function. Namely, only if a control signal, i.e., a gate signal or a base signal, applied to a switching element is removed, the switching element can be turned off and commutate the current flowing therethrough to another switching element, to which a subsequent control signal is applied in accordance with the predetermined sequence.

The switching elements of the inverter 2 have diodes connected in reverse parallel therewith, respectively. This is because the inverter 2 is of a so-called voltage source type. Other types of inverters can be used as the inverter 2. Further, the inverter 2 in this embodiment is operated on the basis of a known pulse width modulation (PWM) control. The inverter 2 itself has no special features and therefore the further description is omitted here.

Reference numeral 3 denotes a transformer, a primary winding of which is supplied with the AC voltage $e_1$ produced by the inverter 2. A secondary winding of the transformer 3 has a center tap, which is coupled with one of output terminals of the power conversion apparatus.

Reference numeral 4 denotes a frequency converter 4, which is provided across the secondary winding of the transformer 3 and formed by two pairs each consisting of two switching elements 41P, 41N and 42P, 42N connected in reverse-parallel with each other. Since switching elements having the self turn-off function, such as GTOs, are employed also in the frequency converter 4, it can perform the commutation operation by oneself in response to control signals applied to gates of the switching elements. Namely, the frequency converter 4 is of a self-commutated converter and, therefore, can perform the commutation operation irrespective of the phase relation of voltage and current.

One ends of the switching element pairs 41P, 41N and 42P, 42N are coupled to both ends of the secondary winding of the transformer 3, respectively, and the other ends thereof are coupled in common with each other. A common connection point of the switching element pairs 41P, 41N and 42P, 42N is coupled to reactor 5. Capacitor 6 is further provided between the reactor 5 and the center tap of the transformer 3 to form a filter together with the reactor 5. An output voltage $e_o$ of the power conversion apparatus is derived from both ends of the capacitor 6 of the filter.

The power conversion apparatus as described above is further provided with an energy regenerating device 7, which is coupled across both ends of the secondary winding of the transformer 3. The device 7 comprises capacitors 78, 79 for absorbing the energy of a spike voltage occurring in the switching elements 41P, 41N, 42P, 42N of the frequency converter 4 and a bridge circuit composed of switching elements 70 to 73 and diodes 74 to 77 connected in reverse parallel therewith. AC terminals of the bridge circuit of the energy regenerating device 7 are coupled to both ends of the secondary winding of the transformer 3. The capacitors 78 and 79 are provided in series between DC terminals of the bridge circuit thereof. A series connection point of the two capacitors 78, 79 is coupled to the common connection point of the switching element pairs 41P, 41N and 42P, 42N.

Referring next to FIGS. 2a to 2h, the operation of the power conversion apparatus shown in FIG. 1 will be explained in the following. However, the explanation will be at first given to the power conversion apparatus without the energy regenerating device 7. Incidentally, it is assumed that the direction of arrows of voltages $e_1$, $e_2$, $e_L$, $e_o$ and currents $i_1$, $i_2$, $i_L$ shown in FIG. 1 represent the positive direction thereof.

As already mentioned, the inverter 2 is operated on the PWM control basis, whereby the pulse-formed voltage $e_1$ of the waveform as shown in FIG. 2a is produced and applied to the primary winding of the transformer 3. The pulse width of the voltage $e_1$ is varied such that a sinusoidal voltage can be obtained across both terminals of the capacitor 6 as the output voltage $e_o$ of the power conversion apparatus. The voltage $e_2$ having the same waveform as the voltage $e_1$ appears across every half part of the secondary winding of the transformer 3, but the amplitude thereof depends on the ratio of the number of turns between the primary and secondary windings of the transformer 3.

The switching elements 41P, 41N, 42P, 42N of the frequency converter 4 are selectively switched on or off, as shown in FIGS. 2c to 2f, in which the high level means that a switching elements is in the on state. Accordingly, it can be considered that gate signals of the waveforms as shown are given to gates of the corresponding switching elements 41P, 41N, 42P, 42N. With those gate signals, the switching elements 41P, 41N, 42P, 42N are repeatedly turned on or off, whereby all of the negative pulses of the voltage $e_2$ are converted into the positive pulses in the duration of $t_0-t_2$, i.e., during the first half of one cycle of the output voltage $e_o$, and vice versa in the duration of $t_2-t_4$, i.e., during the second half cycle thereof, as shown in FIG. 2b.

To this end, as apparent from the gate signals of the switching elements 41P, 41N, 42P, 42N as shown in FIGS. 2c to 2f, one of the switching elements 41P, 41N, through which the load current $i_L$ can flow, is turned on, in the case where the pulse of the voltage $e_2$ is to be made the voltage $e_L$ without its polarity conversion, whereas one of the switching elements 42P, 42N, through which the load current $i_L$ can flow, is turned on, in the case where the pulse of the voltage $e_2$ is to be made the voltage $e_L$ with its polarity conversion.

As a result, there appears the voltage $e_L$ as shown by a solid line in FIG. 2g across the common connection point of the switching element paris 41P, 41N and 42P, 42N and the center tap of the transformer 3. The voltage $e_L$ is averaged by the filter, and a sinusoidal voltage $e_o$ is obtained across the capacitor 6 as the output voltage of the power conversion apparatus, as shown by a broken line in FIG. 2g.

Assuming here that the load current $i_L$ has a phase different from the voltage $e_o$, as shown in FIG. 2h, there occur durations, such as $t_0-t_1$ and $t_2-t_3$, in which the polarities or directions of the voltage $e_o$ and the current $i_L$ are different from each other. If, in such durations, the current $i_L$ is commutated, for example, from the switching element 41N to the switching element 42P, a spike voltage occurs across the switching element 41N upon interruption of the current flowing therethrough. In the following, the problem as mentioned above will be discussed in detail, with reference to FIGS. 3a to 3f.

FIGS. 3a to 3f show the duration of $t_0-t_1$ in FIGS. 2a to 2h in the time-expanded form. If the switching element 41N is turned off after turning-on of the switching element 42P, during the voltage $e_2$ is zero (cf. FIGS. 3b and 3c), the current il flowing through the switching element 41N decreases and the current $i_2$ flowing through the switching element 42P increases, i.e. the load current $i_L$ is commutated from the switching element 41N to the switching element 42P, as shown in FIG. 3d. In this commutation duration, a spike voltage appears across the switching element 41N due to a circuit inductance such as a leakage inductance of the transformer 3, as shown in FIG. 3e.

In order to decrease such a spike voltage and prevent switching elements from being destroyed, each switching element in a conventional power conversion apparatus has been usually provided with a snubber circuit consisting of a diode D, a resistor R and a capacitor C, as shown in FIG. 4. The spike voltage applied to a switching element can be reduced by making the capacitor C of the snubber circuit absorb the energy discharged from a circuit inductance. As a result, a spike voltage becomes small, as shown in FIG. 3f, so that the destruction of switching elements has been prevented. In this manner, the energy transferred from a circuit inductance and stored in a capacitor C of a snubber circuit is only consumed by a resistor R of the snubber circuit. As already mentioned, this fact has made the switching loss large.

Next, there will be explained the commutation operation in switching elements of a power conversion apparatus with the energy regenerating device 7 according to the present invention.

The explanation at first concerns the commutation of the current $i_L$ from the switching element 41N to the switching element 42P, in the case where the voltage $e_o$ is positive and the current $i_L$ is negative, i.e., in the duration of $t_0-t_1$ in FIGS. 2a to 2h. The manner of the commutation in this duration is shown in FIGS. 5a to 5i in the time-expanded form, similarly to FIGS. 3a to 3f.

When the secondary winding of the transformer 3 produces a positive voltage of $e_2$ (cf. FIG. 5a), i.e., before time point $t_5$ in the figures, the switching element 41N is kept at the on state (cf. FIG. 5c) and the current $i_L$ flows therethrough in the forward direction, so that the positive potential of one (upper) end of the secondary winding appears at one (upper) of the output terminals of the power conversion apparatus.

Further, a voltage occurring across both ends of the secondary winding is applied to the capacitor 79 through the switching element 41N, through which the current $i_L$ is now flowing in the forward direction, via a path of the upper end of the secondary winding, the switching element 41N, the capacitor 79, the diode 77 and the lower end of the secondary winding. Because the voltage across the secondary winding is of twice as large as $e_2$, the capacitor 79 is charged by the voltage $2E_d$ in the direction shown in FIG. 1.

When the time point t5 is reached, the voltage $e_2$ becomes zero (cf. FIG. 5a) and therefore the potential appearing at the upper output terminal of the power conversion apparatus disappears. Further, since there is no discharge path of the capacitor 79 at this time, the voltage thereof is maintained at $2E_d$ (cf. FIG. 5g).

Just before the gate signal of the switching element 41N is removed, the switching element 42P is turned on at time point $t_6$ (cf. FIGS. 5b and 5c), whereby the current $i_1$ flowing through the switching element 41N decreases and the current $i_2$ flowing through the switching element 42P increases (cf. FIG. 5f). Namely, the current $i_L$ is commutated from the switching element 41N to the switching element 42P.

At this time, the energy stored in the leakage inductance of the transformer 3 is transferred to the capacitor 79 through the switching element 42P, through which the current $i_L$ is now flowing, via a path of the lower end of the secondary winding, the switching element 42P, the capacitor 79, the diode 76 and the upper end of the secondary winding, whereby the voltage of the capacitor 79 increases by a voltage corresponding to the energy transferred thereto (cf. FIG. 5g).

The commutation of the current is completed at time point $t_7$, at which the whole energy of the leakage inductance is transferred to the capacitor 79 and becomes zero. In the commutation duration of $t_6-t_7$, the voltage of the capacitor 79 is applied to the switching element 41N (cf. FIG. 5h), since the diode 76 is in the conductive state. However, no voltage is applied thereto in the succeeding duration of $t_7-t_8$ after the commutation duration (cf. FIG. 5h), because the diode 76 is made nonconductive due to charging-up of the capacitor 79.

If the switching element 72 of the energy regenerating device 7 is turned on in synchronism with occurrence of the negative voltage of $e_2$ at time point $t_8$ (cf. FIGS. 5a and 5e), the capacitor 79 discharges the energy stored therein toward the transformer 3 through the switching element 42P, through which the current $i_L$ is now flowing in the forward direction, via a path of the capacitor 79, the switching element 42P, the secondary winding, the switching element 72 and the capacitor 79, whereby the energy stored in the capacitor 79 is returned to the transformer 3. The returned energy is rectified by the rectification function of the inverter 2 and given to the power source 1. Namely, the energy stored in the capacitor 79 is regenerated to the power source 1 through the inverter 2. When the voltage of the capacitor 79 decreases down to $2E_d$, it is maintained at that value thereafter (cf. FIG. 5h).

Next, there will be explained the commutation of the current $i_L$ from the switching element 42P to the switching element 41N in the case where the voltage eo is positive and the current $i_L$ is negative. In this case, the switching element 42P is turned off, just after the switching element 41N is turned on. The commutation operation is initiated at the time when a gate signal of the switching element 42P is removed.

In the similar manner to the forgoing, during the commutation duration of the switching element 42P, the energy stored in the leakage inductance of the transformer 3 is transferred to the capacitor 79 through the switching element 41N, through which the current $i_L$ is now flowing in the forward direction, via a path of the upper end of the secondary winding, the switching element 41N, the capacitor 79, the diode 77 and the lower end of the secondary winding, with the result that the capacitor 79 is charged in the direction shown in FIG. 1 at the voltage, which is by a voltage corresponding to the transferred energy higher than $2E_d$.

Thereafter, when the switching element 73 of the energy regenerating device 7 is turned on in synchronism with occurrence of the voltage of $e_2$, the energy stored in the capacitor 79 is discharged toward the transformer 3 through the switching element 41N, through which the current $i_L$ is now flowing in the forward direction, via a path of the capacitor 79, the switching element 41N, the secondary winding, the switching element 73 and the capacitor 79, whereby it is regenerated to the power source 1 through the inverter 2. After the discharge of the capacitor 79, the voltage thereof is maintained at $2E_d$.

Further, in the duration $t_2$–$t_3$ (cf. FIGS. 2g and 2h), in which the voltage $e_o$ is negative and the current $i_L$ is positive, the commutation of the current $i_L$ is carried out, as follows.

At first, the commutation from the switching element 41P to the switching element 42N will be explained. During this commutation operation, the energy stored in the leakage inductance of the transformer 3 is transferred to the capacitor 78 through the switching element 42N, through which the current $i_L$ is now flowing in the forward direction, via a path of the upper end of the secondary winding, the diode 74, the capacitor 78, the switching element 42N and the lower end of the secondary winding, with the result that the capacitor 78 is charged in the direction shown in FIG. 1 at the voltage, which is by a voltage corresponding to the transferred energy high than $2E_d$.

Thereafter, when the switching element 70 is turned on in synchronism with occurrence of the voltage $e_2$, the energy stored in the capacitor 78 is discharged to the transformer 3 via a path of the capacitor 78, the switching element 70, the secondary winding, the switching element 42N and the capacitor 78, whereby it is regenerated to the power source 1 through the inverter 2. As the capacitor 78 discharges, the voltage thereof decreases, and when the voltage reaches at $2E_d$, it is maintained at that value thereafter.

Next, the commutation from the switching element 42N to the switching element 41P will be described. In this case, the energy stored in the leakage inductance of the transformer 3 is transferred to the capacitor 78 through the switching element 41P, through which the current $i_L$ is now flowing in the forward direction, via a path of the lower end of the secondary winding, the diode 75, the capacitor 78, the switching element 41P and the upper end of the secondary winding, and accordingly the capacitor 78 is charged in the direction shown in FIG. 1 at the voltage, which is by a voltage corresponding to the transferred energy higher than $2E_d$.

After that, when the switching element 71 of the energy regenerating device 7 is turned on in synchronism with occurrence of the voltage $e_2$, the energy stored in the capacitor 78 is discharged to the transformer 3 via a path of the capacitor 78, the switching element 71, the secondary winding, the switching element 41P and the capacitor 78, whereby it is regenerated to the power source 1 through the inverter 2. After discharge of the capacitor 78, the voltage thereof is maintained at $2E_d$.

In this manner, an energy stored in the circuit inductance such as the leakage inductance of the transformer 3 is absorbed in the capacitor 78, 79 and then the energy absorbed therein is discharged and regenerated to the power source 1. Therefore, a high efficiency power conversion apparatus can be realized. In addition, since the capacitors 78, 79 cramp the spike voltage at $e_2$, i.e., $2E_d$, the voltage applied across switching elements upon turning-off thereof can be reduced.

Further, in the foregoing, there has been discussed only a commutation operation, which takes place during the polarities of the voltage $e_o$ and the current $i_L$ are different from each other. The explanation of a commutation operation, during the polarity of the voltage $e_o$ is the same as that of the current $i_L$, is omitted, because it is possible to achieve the commutation operation without a particular problem in the similar manner to that in the conventional apparatus.

Figure 6:
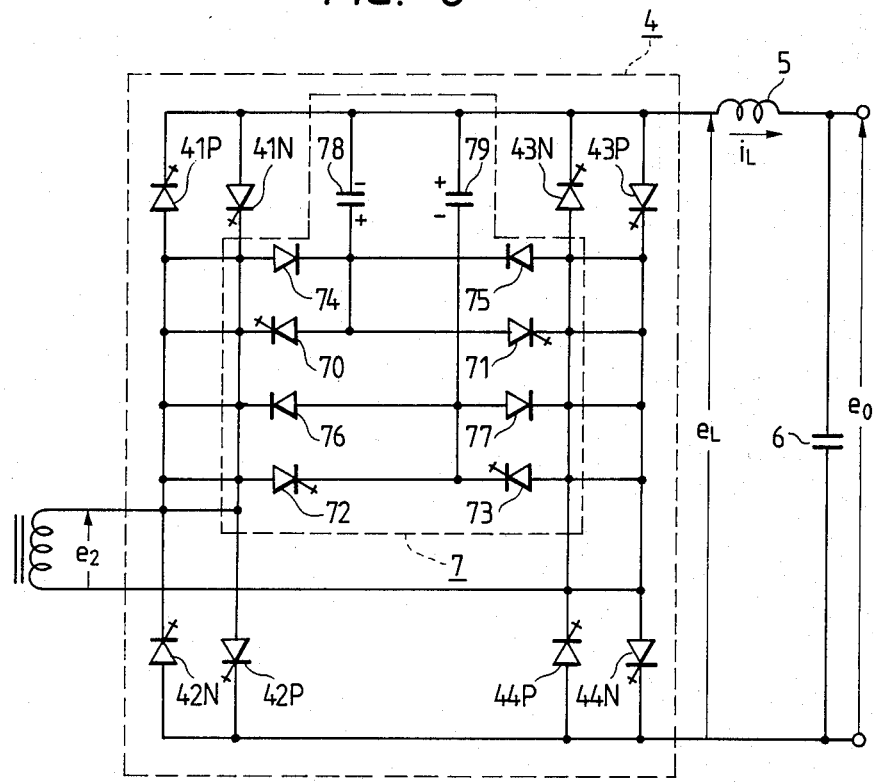
FIG. 6 schematically shows a part of a circuit arrangement of a power conversion apparatus according to another embodiment of the present invention.

Referring next to FIG. 6, the explanation will be given to a power conversion apparatus according to another embodiment of the present invention. In the figure, there is shown a part of a circuit arrangement of the another embodiment, i.e., the configuration of the frequency converter 4 including the energy regenerating device 7.

As will be understood from the figure, the frequency converter 4 consists of a bridge circuit, each bridge arm of which is composed of two switching elements 41P and 41N, 42P and 42N, 43P and 43N, or 44P and 44N connected in reverse-parallel with each other. AC terminals of the frequency converter bridge are coupled to both ends of the secondary winding of the transformer 3. An output voltage $e_o$ of the power conversion apparatus can be derived from DC terminals of the bridge through the filter consisting of the reactor 5 and the capacitor 6. Further, it is to be noted that the transformer 3 has a secondary winding having no center tap. Other reference numerals and symbols, which are the same as in FIG. 1, represent the same parts or electric amounts.

The frequency converter 4 shown in FIG. 6 achieves the same function as that in FIG. 1 by controlling the switching element pairs 41P and 41N, 42P and 42N, 43P and 43N, and 44P and 44N in accordance with the polarities of the voltage $e_2$, the output voltage $e_o$ and the load current $i_L$, as follows. Namely, when a voltage pulse of $e_2$ is converted into that of $e_o$ without changing the polarity, switching elements of the pairs 41P, 41N and 44P, 44N, through which the current $i_L$ can flow, are turned on, whereas when the former is converted into the latter with the polarity changed, switching elements of the pairs 42P, 42N and 43P. 43N, through which the current $i_L$ can flow, are turned on.

The energy regenerating device 7 is formed by the switching elements 70 to 73 in the similar manner to that in FIG. 1. However, the connecting point of the two capacitors 78 and 79 is coupled to one of the AC terminals of the frequency converter bridge, i.e., to the common connection point of the switching element pairs 41P, 41N and 42P, 42N in this case.

There is at first explained the commutation of the current from the switching elements 41N, 44N to the switching elements 42P, 43P, in the case where the output voltage $e_o$ is positive and the current $i_L$ is negative, i.e., in the duration $t_0$–$t_1$ in FIGS. 2g and 2h.

In this case, during the commutation duration of the switching elements 41N, 44N, the energy stored in the leakage inductance of the transformer 3 is transferred to the capacitor 79 through the switching element 43P, through which the current is now flowing in the forward direction, via a path of the lower end of the secondary winding, the switching element 43P, the capacitor 79, the diode 76 and the upper end of the secondary winding. As a result, the capacitor 79 is charged in the direction shown at the voltage, which is by a voltage corresponding to the transferred energy higher than $E_d$.

After that, when the switching element 72 of the energy regenerating device 7 is turned on in response to occurrence of the voltage $e_2$, the energy stored in the capacitor 79 is discharged to the transformer 3 via a path of the capacitor 79, the switching element 43P, the secondary winding, the switching element 72 and the capacitor 79, whereby it is regenerated to the power source 1 through the inverter 2. With discharge of the capacitor 79, the voltage thereof decreases, and when the voltage reaches $E_d$, it is maintained at that value thereafter.

In the commutation of the current from the switching elements 42P, 43P to the switching elements 41N, 44N, the energy stored in the leakage inductance of the transformer 3 is transferred to the capacitor 79 through the switching element 41N, through which the current is now flowing, via a path of the upper end of the secondary winding, the switching element 41N, the capacitor 79, the diode 77 and the lower end of the secondary winding. As a result, the capacitor 79 is charged in the direction shown at the voltage, which is by a voltage corresponding to the transferred energy higher than $E_d$.

Thereafter, when the switching element 73 of the energy regenerating device 7 is turned on in response to occurrence of the voltage $e_2$, the energy stored in the capacitor 79 is discharged to the transformer 3 via a path of the capacitor 79, the switching element 41N, the secondary winding, the switching element 73 and the capacitor 79, whereby it is regenerated to the power source 1 through the inverter 2. After discharge of the capacitor 79, the voltage thereof becomes $e_2$, i.e., $E_d$, and is maintained at that value thereafter.

Next, there is explained the commutation from the switching elements 41P, 44P to the switching elements 42N, 43N, in the case where the output voltage $e_o$ is negative and the current $i_L$ is positive, i.e., in the duration $t_2-t_3$ in FIGS. 2g and 2h.

In this case, during the commutation of the switching elements 41P 44P, the energy stored in the leakage inductance of the transformer 3 is transferred to the capacitor 78 through the switching element 43N, through which the current $i_L$ is now flowing, via a path of the upper end of the secondary winding, the diode 74, the capacitor 78, the switching element 43N and the lower end of the secondary winding. The capacitor 78 is charged in the direction shown at the voltage, which is by a voltage corresponding to the transferred energy higher than $E_d$.

After that, when the switching element 70 of the energy regenerating device 7 is turned on in response to occurrence of the voltage $e_2$, the energy stored in the capacitor 78 is discharged to the transformer 3 via a path of the capacitor 78, the switching element 70, the secondary winding, the switching element 43N and the capacitor 78, whereby it is regenerated to the power source 1 through the inverter 2. After discharge of the capacitor 78, the voltage thereof becomes $e_2$ and is maintained at that value thereafter.

Further, in the commutation of the current from the switching elements 42N, 43N to the switching elements 41P, 44P, the energy stored in the leakage inductance of the transformer 3 is transferred to the capacitor 78 through the switching element 41P, through which the current $i_L$ is now flowing, via a path of the lower end of the secondary winding, the diode 75, the capacitor 78, the switching element 41P and the upper end of the secondary winding. The capacitor 78 is charged in the direction shown at the voltage, which is by a voltage corresponding to the transferred energy higher than $E_d$.

When the switching element 71 of the energy regenerating device 7 is turned on in response to occurrence of the voltage $e_2$, the energy stored in the capacitor 78 is discharged to the transformer 3 via a path of the capacitor 78, the switching element 71, the secondary winding, the switching element 41P and the capacitor 78, whereby it is regenerated to the power source 1 through the inverter 2. With discharge of the capacitor 78, the voltage thereof decreases, and when the voltage reaches $E_d$, it is maintained at that value thereafter.

According to this embodiment, the switching elements 41P, 41N, 42P, 42N, 43P, 43N, 44P, 44N and 70 to 73, the diodes 74 to 77 and the capacitors 78, 79 are usually applied by the voltage of $E_d$, because the transformer 3 is not of a center tap type. Therefore, there can be employed components having the voltage capacity smaller than those in the embodiment of FIG. 1.

Although, in FIG. 6, the connecting point of the capacitors 78, 79 is coupled to the common connection point of the switching element pairs 41P, 41N and 43P, 43N, it can be coupled to the common connection point of the switching element pairs 42P, 42N and 44P, 44N. Further, there can also be provided another energy regenerating device, AC terminals of which are coupled to both ends of the secondary winding and a connecting point of the two capacitors 78, 79 is coupled to the common connection point of the switching element pairs 42P, 42N and 44P, 44N.

Figure 7:
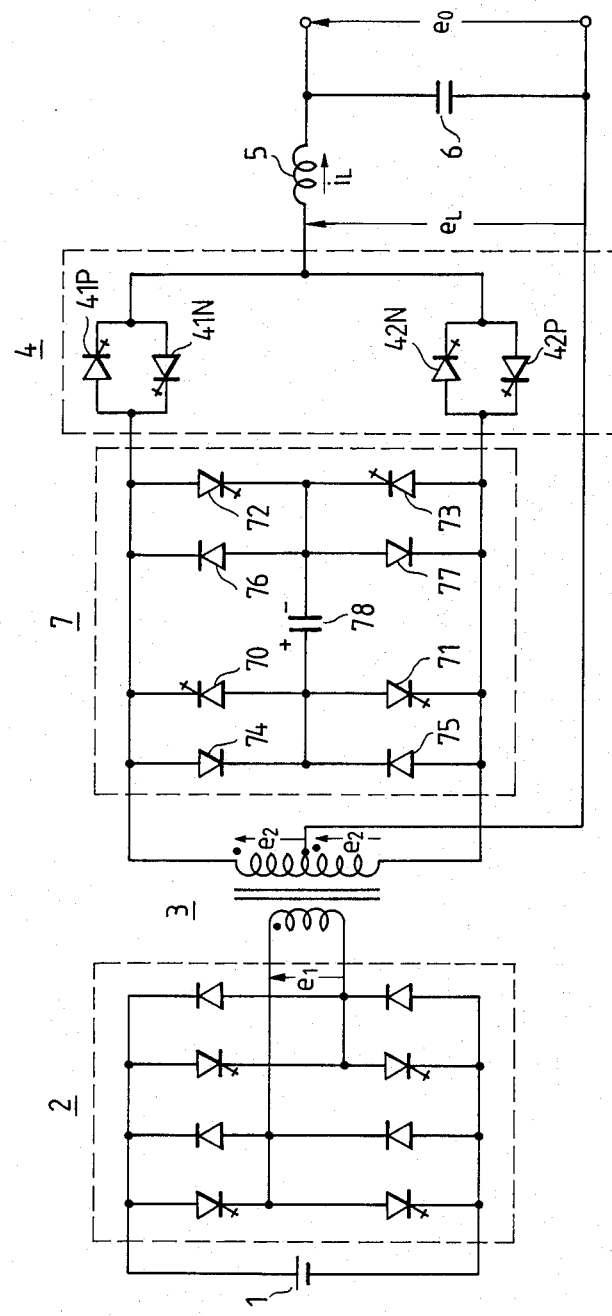
FIG. 7 schematically shows a circuit arrangement of a power conversion apparatus according to still another embodiment of the present invention.

In FIG. 7, there is shown a circuit arrangement of a power conversion apparatus according to still another embodiment of the present invention. In the figure, the same reference numerals or symbols represent the same parts or electric amounts as in FIG. 1.

As apparent from the figure, the circuit of this embodiment is the same as that in FIG. 1, except the configuration of the energy regenerating device 7. Namely, in the energy regenerating device 7 of this embodiment, only one capacitor is provided across DC terminals of a bridge circuit thereof in order to absorb the energy of a spike voltage occurring upon the commutation of the switching elements 41P, 41N, 42P and 42N. The switching elements 70, 73 and 71, 72 of the energy regenerating device 7 are turned on in synchronism with each other in accordance with the polarity of the voltage $e_2$, whereby the discharge of the capacitor 78 is controlled in the similar manner to the capacitors in FIG. 1 and 6.

In the commutation from the switching element 41N to the switching element 42P, in the case where the voltage $e_o$ is positive and the current $i_L$ is negative, i.e., in the duration of $t_0-t_1$ in FIGS. 2g and 2h, the energy stored in the leakage inductance of the transformer 3 is transferred to the capacitor 78 via a path of the lower end of the secondary winding, the diode 75, the capacitor 78, the diode 76 and the upper end of the secondary winding. As a result, the capacitor 78 is charged in the direction shown at the voltage, which is by a voltage corresponding to the transferred energy higher than $2E_d$.

If, when the polarity of the voltage across the secondary winding changes, the switching elements 71 and 72 of the energy regenerating device 7 are turned on synchronously with each other, the energy stored in the capacitor 78 is discharged to the transformer 3 via a path of the capacitor 78, the switching element 71, the secondary winding, the switching element 72 and the capacitor 78, whereby it is regenerated to the power source 1 through the inverter 2. When the voltage of the capacitor 78 decreases down to $2E_d$ with discharge, it is maintained at that value thereafter.

In the commutation from the switching element 42P to the switching element 41N, the energy stored in the leakage inductance of the transformer 3 is transferred to the capacitor 78 via a path of the upper end of the secondary winding, the diode 74, the capacitor 78, the diode 77 and the lower end of the secondary winding. As a result, the capacitor 78 is charged in the direction shown at the voltage, which is by a voltage corresponding to the transferred energy higher than $2E_d$.

If, when the polarity of the voltage across the secondary winding changes, the switching element 70 and 73 of the energy regenerating device 7 are turned on synchronously with each other, the energy stored in the capacitor 78 is discharged to the transformer 3 via a path of the capacitor 78, the switching element 70, the secondary winding, the switching element 73 and the capacitor 78, whereby it is regenerated to the power source 1 through the inverter 2. When the voltage of the capacitor 78 decreases down to $2E_d$ with discharge, it is maintained at that value thereafter.

Figure 8:
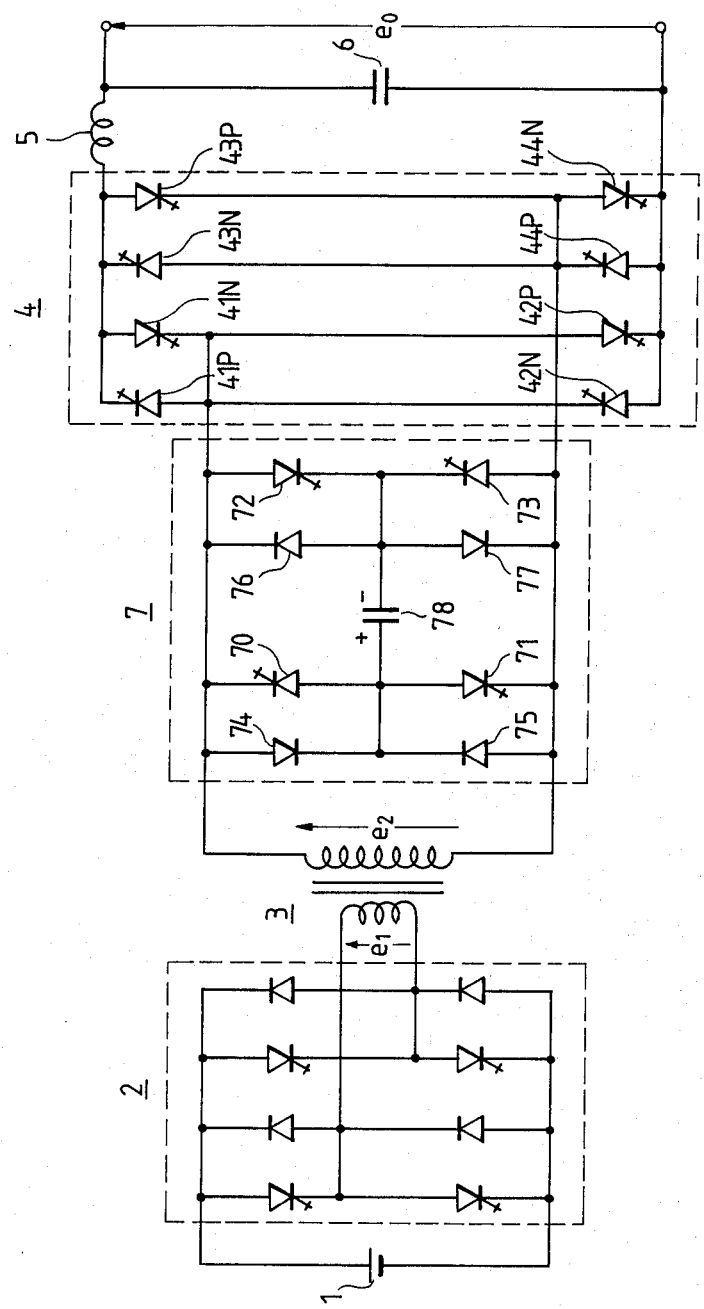
FIG. 8 schematically shows a circuit arrangement of a power conversion apparatus according to further embodiment of the present invention.

In FIG. 8, there is shown a power conversion apparatus according to further embodiment of the present invention, in which the same reference numerals or symbols represent the same parts or electric amounts as in Fig. 1. As apparent from the figure, the circuit arrangement in this figure is constructed by combining the frequency converter 4 as shown in FIG. 6 and the energy regenerating device 7 as shown in FIG. 7. Therefore, the operation of this circuit arrangement will be understood from the foregoing explanation. Further description thereof is omitted here in order to avoid the unnecessary prolixity in the specification.

As described above, according to the present invention, the energy of a spike voltage occurring upon interruption of a current flowing through switching elements of a frequency converter of a power conversion apparatus can be absorbed in a capacitor, and the energy stored in the capacitor is regenerated to a power source of the power conversion apparatus, whereby it becomes possible to reduce the spike voltage and a power conversion apparatus with the high conversion efficiency can be provided.

We claim:

1. A power conversion apparatus having:
    a DC power source;
    an inverter, fed by said DC power source, for producing AC power having a certain frequency;
    a transformer having a primary winding supplied with the AC power output from said inverter and a secondary winding for outputting AC power, the voltage of which is adjusted at a desired value; and
    a frequency converter for converting the frequency of the AC power output from the secondary winding into a desired frequency, which is lower than the certain frequency of the AC power
    characterized in that
    said frequency converter is formed by switching elements with the self turn-off function and further provided with an energy regenerating device comprising first means, coupled across both ends of the secondary winding, for absorbing the energy of a spike voltage occurring due to a circuit inductance upon interruption of a current flowing through each element of said frequency converter and second means for switching over the direction of coupling the first means with the secondary winding in accordance with the polarity of a voltage appearing across the secondary winding so that the energy stored in the first means is regenerated to said transformer.

2. A power conversion apparatus according to claim 1,
    characterized in that
    the secondary winding of said transformer has a center tap, and said frequency converter includes two pairs each consisting of two switching elements connected in reverse-parallel with each other, one ends of the pairs of the reverse-parallel connected switching elements being coupled to both ends of the secondary winding, respectively, and the other ends thereof being coupled in common with each other, whereby an output voltage of the power conversion apparatus is derived from the center tap and a common connection point of the switching element pairs of said frequency converter.

3. A power conversion apparatus according to claim 2,
    characterized in that
    the second means of said energy regenerating device is formed by switching elements connected in the bridge form and diodes connected in reverse-parallel with the switching elements, AC terminals of the bridge circuit being coupled to both ends of the secondary winding, respectively, and the first means thereof is provided between DC terminals of the bridge circuit of the second means.

4. A power conversion apparatus according to claim 3,
    characterized in that
    the first means of said energy regenerating device includes two capacitors connected in series between the DC terminals of the bridge circuit of the second means, and a connecting point of the two capacitors is coupled to the common connection point of the switching element pairs of said frequency converter.

5. A power conversion apparatus according to claim 3,
    characterized in that
    the first means of said energy regenerating device includes a signal capacitor provided between the DC terminals of the bridge circuit of the second means.

6. A power conversion apparatus according to claim 1,
    characterized in that
    said frequency converter consists of a bridge circuit, each bridge arm of which is composed of two switching elements connected in reverse-parallel with each other, AC terminals of the frequency converter bridge being coupled to both ends of the secondary winding, respectively, and an output voltage of the power conversion apparatus being derived from DC terminals of the frequency converter bridge.

7. A power conversion apparatus according to claim 6,
    characterized in that the second means of said energy regenerating device is formed by switching elements connected in the bridge form and diodes connected in reverse-parallel with the switching elements, AC terminals of the bridge circuit of the second means being coupled to both ends of the secondary winding, respectively, and the first means thereof is provided between DC terminals of the bridge circuit of the second means.

8. A power conversion apparatus according to claim 7, characterized in that the first means of said energy regenerating device includes two capacitors connected in series between the DC terminals of the bridge circuit of the second means, and a connecting point of the two capacitors is coupled to one of the DC terminals of the bridge circuit of said frequency converter.

9. A power conversion apparatus according to claim 7, characterized in that the first means of said energy regenerating device includes a single capacitor provided between the DC terminals of the bridge circuit of the second means.

* * * * *